Figure 1:
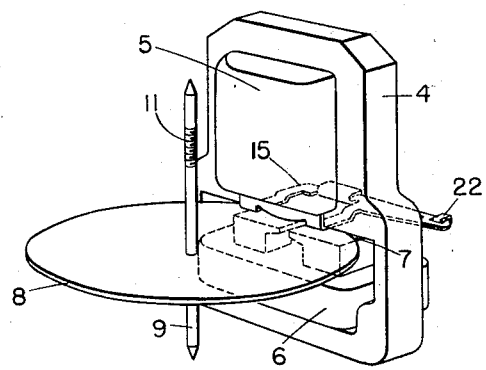

Oct. 28, 1958

R. G. JEWELL 2,858,508

LAG PLATE

Filed Dec. 27, 1955

INVENTOR.
Richard G. Jewell
BY Richard E. Horley
His Attorney

United States Patent Office 2,858,508
Patented Oct. 28, 1958

2,858,508

LAG PLATE

Richard G. Jewell, Swampscott, Mass., assignor to General Electric Company, a corporation of New York Application December 27, 1955, Serial No. 555,705

4 Claims. (Cl. 324—138)

This invention relates generally to an adjustable lag plate for an alternating current watthour meter and in particularly relates to improved temperature compensating arrangements in such a plate.

Alternating current watthour meters usually comprise suitable potential and current coils arranged relative to a rotatably mounted disc such that the interaction of the torque produced on the disc by the fluxes developed by the potential and current coils causes the disc to rotate. In using such a meter to measure the electrical power consumed in an electrical circuit, the potential coil is usually connected across the lines feeding the circuit whereas the current coil is connected in series with the circuit load. In this way, the rotation of the disc is a function of power consumed and suitable means are provided in the meter to respond to the revolutions of the disc and thus indicate power consumed.

For proper operation of such meters, it is necessary, among other things, to obtain a quadrature relationship between the potential and current fluxes at unity power factor and it is also necessary to provide temperature compensation for the class of temperature errors which are pronounced at low power factors (substantially below unity).

Heretofore, in the mass manufacture of watthour meters, it has been known to provide means which are settable in the factory to obtain proper quadrature relationships between the potential and current fluxes and which also include means to provide the aforesaid required temperature compensation.

One commercial arrangement of such means has taken the form of the lag plate shown in U. S. Patent 2,321,437, issued June 8, 1943, in the name of Harold E. Trekell, and assigned to the same assignee to which the instant application is assigned. In the aforesaid patent, it is seen that the lag plate is in the form of a closed single turn electrically conducting loop that is adjustable by having an extendable portion arranged to change the length of the loop and thus vary its resistance. The plate also carries a temperature compensating magnetic circuit member in inductive relation to a portion of the loop. In use, the spaced parallel bridging members formed in the extendable portion of the loop are adapted to be selectively and progressively severed to change the resistance of the loop and thus alter the action of the plate, which, for convenience, may be referred to hereafter as the amount of lagging done thereby.

As the bridging members are progressively severed, the resistance of the plate progressively increases to progressively decrease the amount of lagging done by the plate.

Since the temperature compensating arrangements in such a plate usually include an iron member surrounding a portion of the lag plate, between which is a suitable temperature sensitive magnetic material, it is seen that the temperature compensating arrangements add reactance to the plate. This reactance affects the magnitude and the phase angle of the current flowing in the lag plate and thus affects the amount of lagging done by the plate. The reactance decreases as the temperature increases because of the temperature sensitive magnetic material forming a part thereof, and it is this change in reactance which produces the required temperature compensation, hereinafter referred to as class II temperature compensation.

With the aforesaid type of lag plate, it has been found that the reactance in the plate cannot be large compared to the resistance of the plate for, if such were the case, the severing of the bridging members would have little or no effect on lagging. Thus, the reactance must be limited to a value such that severing of the bridging members will have an effect on lagging whereby the plate functions properly to adjust the performance characteristic of the watthour meter.

On the other hand, it has also been found that if the reactance is limited to a value such that severing of the first bridging member produces an effect on lagging, in those meters requiring all bridging members to be severed to obtain proper adjustment of the plate, the resistance of the plate will then become large compared to the reactance. In such a plate, the change in reactance caused by temperature changes will have a reduced effect on lagging, thereby causing the plate to have insufficient class II temperature compensation. Moreover, the condition is further aggravated, because with maximum plate resistance there will be minimum plate current and the temperature sensitive material will be operating below the desired level of permeability because of the lower flux density resulting from the reduced current flow.

Thus, it is seen that class II temperature compensating means in combination with a lag plate that may be adjusted by having its resistance varied may often give rise to an arrangement that will not produce sufficient class II temperature compensation in a particular watthour meter being adjusted.

Therefore, it is an object of the invention to provide an improved lag plate that may be adjusted by having its resistance varied wherein proper class II temperature compensation is obtained for all values of resistance of the plate within the range of adjustment.

It is a further object of the invention to provide such an improved lag plate without significantly adding to the cost or complexity of lag plates heretofore used.

Briefly, the invention comprises a lag plate in the form of a sheet of electrically conducting material having an opening therein to form a single turn closed electrical loop adapted to be fixedly secured proximate to the potential coil of an alternating curret watthour meter. Moreover, the lag plate has a first portion that has a part that is selectively extendable to vary the length of the loop and thus modify its resistance and also includes a first temperature compensating magnetic circuit member in inductive relation to a second portion of the loop. Additionally, a second temperature compensating magnetic circuit member is in inductive relation to another part of the first portion of the loop and is arranged to be shunted by the extendable part, the shunting effect decreasing as the length of the loop increases such that the compensating effect of the second temperature compensating member increases upon increase in loop resistance.

The second temperature compensating member has little or no effect on the lagging done by the plate when the plate resistance is at a minimum, but its compensating effect increases with an increase in resistance to compensate for the decrease in the compensating effect of the first temperature compensating member resulting from the increase in loop resistance. Thus, the ratio of reactance to resistance is maintained at an effective value for all values of plate resistance, and the class II temperature compensation is maintained more uniformly through the range in lagging done by the plate.

Figure 2:
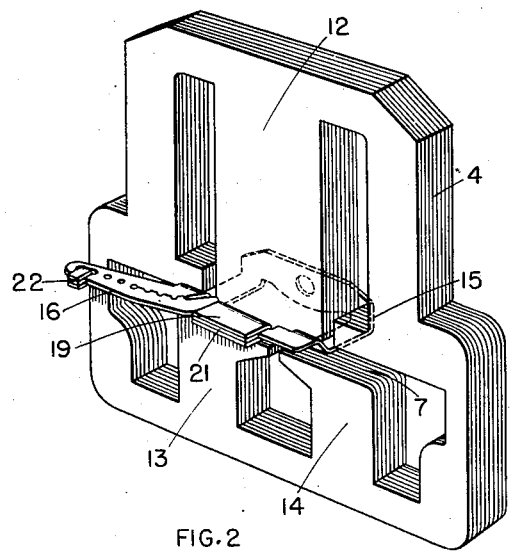
Figure 3:
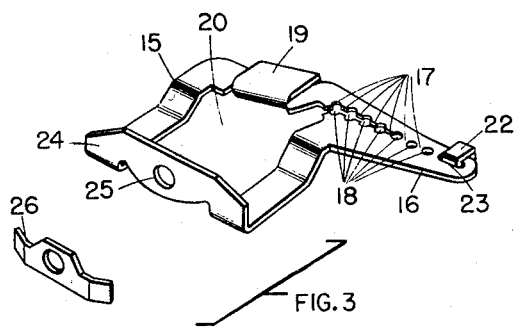

The objects of the invention, as well as the benefits and advantages to be derived therefrom will be more readily understood upon reference to the detailed description set forth below, particularly when taken in conjunction with the drawings annexed hereto, in which:

Figure 1 is a partial perspective view of an alternating current watthour meter in which is mounted the improved lag plate forming the subject invention; and, Figure 2 is a slightly enlarged view of the magnetic frame forming a part of the watthour meter shown in Figure 1, turned around to better show the manner in which the improved lag plate is mounted therein; and, Figure 3 is a slightly enlarged view of the improved lag plate shown in Figures 1 and 2, including the mounting bracket used for securing the plate to the watthour meter.

Referring first to Figure 1, there is shown a portion of a conventional alternating current watthour meter including a main magnetic frame 4 on which are wound the potential coil 5 and the current coil 6. Both of these coils may have suitable electrical insulation molded around the conducting portions of the coil and each is mounted on the frame 4 on opposite sides of an air gap 7 into which extends a portion of an induction disc 8 carried by a rotatably mounted shaft 9. The shaft may have a threaded section 11 intended to cooperate with a suitable gear train coupling the shaft to a suitable registering mechanism. The frame, coils, disc, and shaft, together with the supporting and bearing members therefor, as well as the related registering devices and other component parts making up a complete watthour meter, may all be of conventional design, and since such parts of the watthour meter are well understood by those skilled in the art, further discussion will be omitted in the interests of brevity.

Turning now to Figure 2, it is seen that the frame 4 has an upper central core portion 12 on which the potential coil 5 is mounted and has a pair of lower spaced core members 13, 14, on each of which is mounted one-half of the current coil 6. The core 12 may be conveniently referred to as the potential pole, whereas the cores 13, 14 may be referred to as the current pole, it being understood that both poles direct magnetic flux across the air gap 7, these fluxes interacting with the induction disc 8 to cause rotation thereof.

For proper operation of such watthour meters, it is necessary that the potential flux have a quadrature relationship with the current flux at unity power factor, and to this end, a lag plate 15 is fixedly secured to the watthour meter and so devised as to permit adjustment of the quadrature relationship of the fluxes. Since the potential flux should lag the current flux by 90° at unity power factor, the plate 15 is termed a lag plate and its effect on the meter may be characteristically described as the amount of lagging done thereby.

Looking now at Figure 3, it is seen that the lag plate 15 comprises a sheet of suitable electrical conducting material having an opening 20 therein to form a single turn closed electrically conducting loop. The plate also has the elongated extendable portion 16 at one corner thereof which includes a series of substantially parallel, spaced bridging members 17 separated by the apertures 18.

Rigidly mounted on another portion of the plate is a first temperature compensating magnetic circuit member in the form of a flat hairpin-like body 19, formed of a suitable magnetic material such as iron or the like, between the outer legs of which is a strip of temperature sensitive magnetic material 21. The iron body 19 and the compensating strip 21 form a closed loop around a portion of the plate 15 such that the compensating strip is in inductive relation to the lag plate.

The arrangement described so far is substantially identical to the lag plate shown in the aforesaid Patent No. 2,321,437, and this patent may be referred to for a more detailed description thereof.

The bridging members 17 are severable and are arranged to be severed in the factory, the exact number being severed varying from meter to meter depending upon the degree of lagging that must be done by the plate.

In those instances wherein all, or nearly all of the bridging members must be served to obtain proper lagging, it has been found that the increase in resistance resulting from such adjustment reduces the effectiveness of the compensating strip 21, in a manner as described above. Since the strip 21 provides so-called class II temperature compensation, the effect of severing all or nearly all of the bridging members results in a meter that has insufficient class II temperature compensation.

To overcome the aforementioned difficulties, a second temperature compensating circuit member 22 is mounted in inductive relation to the outer tip of the extendable portion 16, the tip having a suitable aperture 23 to accommodate the second compensating member. Member 22 has the same configuration as the combination of loop 19 and strip 21 as it also comprises a loop and compensating strip arrangement, the only difference being that member 22 is smaller than its counterpart.

The two compensating strips may be formed of the same temperature sensitive magnetic material, their precise mounting arrangements and composition being either as shown herein, or as further described in the aforementioned Patent No. 2,321,437, including U. S. Patents 2,050,881 and 2,146,606 discussed therein.

To mount the plate 15 on an associated watthour meter, one of its legs is turned at right angles to the remainder of the plate to form the mounting flange 24 which is adapted to engage the lower portion of potential pole 12. The flange has an aperture 25 through which may pass a suitable threaded bolt carried by the apertured mounting bracket 26, the bolt in turn cooperating with a threaded aperture in pole 12 such that the plate is secured thereto. The opening in the plate has an area approximating the cross sectional area of the pole 12 to permit the plate to substantially straddle the lower end of pole 12. There may be some portions of the plate overlying edge portions of the pole, but, in any event, the parts are so related as to induce sufficient current in the plate for compensation purposes.

In the practice of the invention, the lag plate is assembled to the watthour meter at some convenient point in the manufacture thereof, at which time none of the bridges 17 has been severed. When he lagging characteristics of the meter are tested, the bridging members 17 will be progressively severed, as required, to properly adjust the lagging characteristic.

In so severing the bridging members, the one nearest the central opening in the plate will be severed first, after which succeeding bridging members will be severed as desired. As each bridging member is severed, the length of the conducting loop will be increased to increase the resistance of the loop, and this change in resistance will adjust the quadrature relationship of the potential and current fluxes. For a limited number of bridging members severed, the compensating strip 21 will provide effective class II temperature compensation, and the compensating member 22 will have little or no effect on class II temperature compensation because of the combined shunting effect of the unsevered bridging members in parallel therewith.

However, as more bridging members are severed, their combined shunting effect will be progressively reduced to thereby permit the compensating member 22 to exert an increasing effect on class II temperature compensation. Since the compensating effect of strip 21 is being reduced by the increased loop resistance, the member 22 will make up for the reduction in effectiveness of strip 21 to provide sufficient class II temperature compensation. Thus, the two compensating members work together to provide effective class II temperature compensation and the arrangement of the member 22 is such that adjustment of the quadrature relationship of the fluxes is substantially unaffected thereby.

Moreover, the addition of member 22 does not add significantly to the cost or complexity of the lag plate, since it may be formed and mounted on the lag plate in the same manner as strip 21, without involving any new or costly manufacturing techniques.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In an induction watthour meter having voltage and current electromagnets separated by an air gap in which is mounted a rotary disc armature, a lag plate therefore, comprising: a closed electrically conducting metallic loop fixedly secured to one of said electromagnets and located thereon in a position at which the flux of the electromagnet links said loop to induce a current therein, said loop having an elongated portion provided with means at its inner end for varying its resistance by short circuiting the portion at different points therealong, a first temperature compensating closed loop of magnetic material surrounding another portion of said conducting loop in inductive relation thereto, said first compensating loop having a compensating effect which varies from a maximum to a minimum value when the resistance of the conducting loop is varied from a minimum to a maximum value, and a second temperature compensating closed loop of magnetic material surrounding a part of the outer end of said elongated portion in inductive relation thereto, said second compensating loop having a compensating effect which varies from a minimum to a maximum value when the resistance of the conducting loop is varied from a minimum to a maximum value, said first and second compensating loops functioning together to provide substantially uniform temperature compensation for all values of resistance of said loop.

2. The invention defined by claim 1 wherein the inner end of said elongated portion includes a plurality of spaced parallel bridging members, all of said bridging members forming parallel conducting paths in said loop and being selectively and sequentially severable to progressively decrease the number of parallel conducting paths, each of said bridging members acting as a shunt for succeeding bridging members.

3. The invention defined by claim 2 wherein each of said magnetic loops includes portions of temperature responsive magnet material.

4. The invention defined by claim 3 wherein the conducting loop is approximately in the shape of a square turn with the elongated portion extending out from one corner thereof and being approximately hairpin-like in configuration.

References Cited in the file of this patent
UNITED STATES PATENTS 2,321,437     Trekell _____ June 8, 1943

FOREIGN PATENTS 216,601     Switzerland _____ Aug. 31, 1941